Oct. 24, 1944.  J. E. McBRIDE  2,361,222
CONVEYING MECHANISM
Filed Dec. 26, 1941  9 Sheets-Sheet 3

Fig. 3.

INVENTOR
Jesse E. McBride
BY
ATTORNEY

Oct. 24, 1944.    J. E. McBRIDE    2,361,222
CONVEYING MECHANISM
Filed Dec. 26, 1941    9 Sheets-Sheet 4

INVENTOR
Jesse E. McBride
BY Joseph Farley
ATTORNEY

Oct. 24, 1944.　　　J. E. McBRIDE　　　2,361,222
CONVEYING MECHANISM
Filed Dec. 26, 1941　　　9 Sheets-Sheet 5

Fig. 5.

INVENTOR
Jesse E. McBride.
BY Joseph Darley
ATTORNEY

Oct. 24, 1944.  J. E. McBRIDE  2,361,222
CONVEYING MECHANISM
Filed Dec. 26, 1941  9 Sheets-Sheet 7

INVENTOR
Jesse E. McBride
BY Joseph Darley
ATTORNEY

Oct. 24, 1944. J. E. McBRIDE 2,361,222
CONVEYING MECHANISM
Filed Dec. 26, 1941 9 Sheets-Sheet 9

Fig. 14.
UNLOADER TRAVERSE
LIMIT SWITCH-154

Fig. 16.
UNLOADER TILT
LIMIT SWITCH 156

Fig. 17.
CONVEYOR DRIVE
LIMIT SWITCH 157

UNLOADER TRAVERSE
ADJUSTABLE LIMIT
SWITCH - 155

Fig. 15.

INVENTOR
Jesse E. McBride
BY
ATTORNEY

Patented Oct. 24, 1944

2,361,222

UNITED STATES PATENT OFFICE 2,361,222

CONVEYING MECHANISM

Jesse E. McBride, Highland Park, Mich.

Application December 26, 1941, Serial No. 424,380

10 Claims. (Cl. 80—42)

This invention relates to conveying mechanism and installation selected for illustrating the principles of the invention is particularly concerned with conveying equipment for handling hot strip steel in coils.

In steel mills rolling strip steel, it is practice to coil relatively long strips of steel on reels at the end of the rolling process, these coils weighing up to approximately 28,000 pounds. Coils when wound on to the reels at the end of the run-out tables are still at a relatively high temperature and if the coils are stripped from the reels and carried other than in a vertical position, there is a tendency to deform the coils, which is of course detrimental.

It is important, therefore, that in order to remove the hot coils as fast as they are reeled from the end of the run-out tables that some method be devised whereby the coils may be given a cooling period in a vertical position without interfering with the continuous uninterrupted operation of removing them from the reels as fast as they are produced.

It is, therefore, a primary object of the present invention to provide conveyor mechanism capable of automatic operation and adaptable to the removal of hot coils of steel from the producing end of the steel mill as fast as it is discharged therefrom and to provide conveying mechanism for carrying these coils for a sufficient length of time and in suitable position for cooling and then to remove these coils from the cooling conveyor unit from which they can be stored.

It is a further object to provide conveyor mechanism comprising loading and unloading units operating in synchronism with a "Carry-All" cooling conveyor, whereby coils of strip steel are loaded and unloaded in continuous manner. The said loaders and unloaders approach the conveyor and perform the unloading and loading function while said conveyor is in a stopped position, the forward movement of the conveyor being effected during the time when the loading and unloading mechanisms are in positions away from the position adjacent the conveyor.

It is a further object to synchronize the loading and unloading mechanisms with a step by step movement of the conveyor, the conveyor being controlled with definite cycle of acceleration, uniform speed, and deceleration.

The above and other objects of the invention will appear more fully in the following more detailed description and by reference to the accompanying drawings, forming a part hereof and wherein:

Fig. 10a shows an end view of a limit switch cam with diagrammatic showing of operation of a switch.

Figure 1:
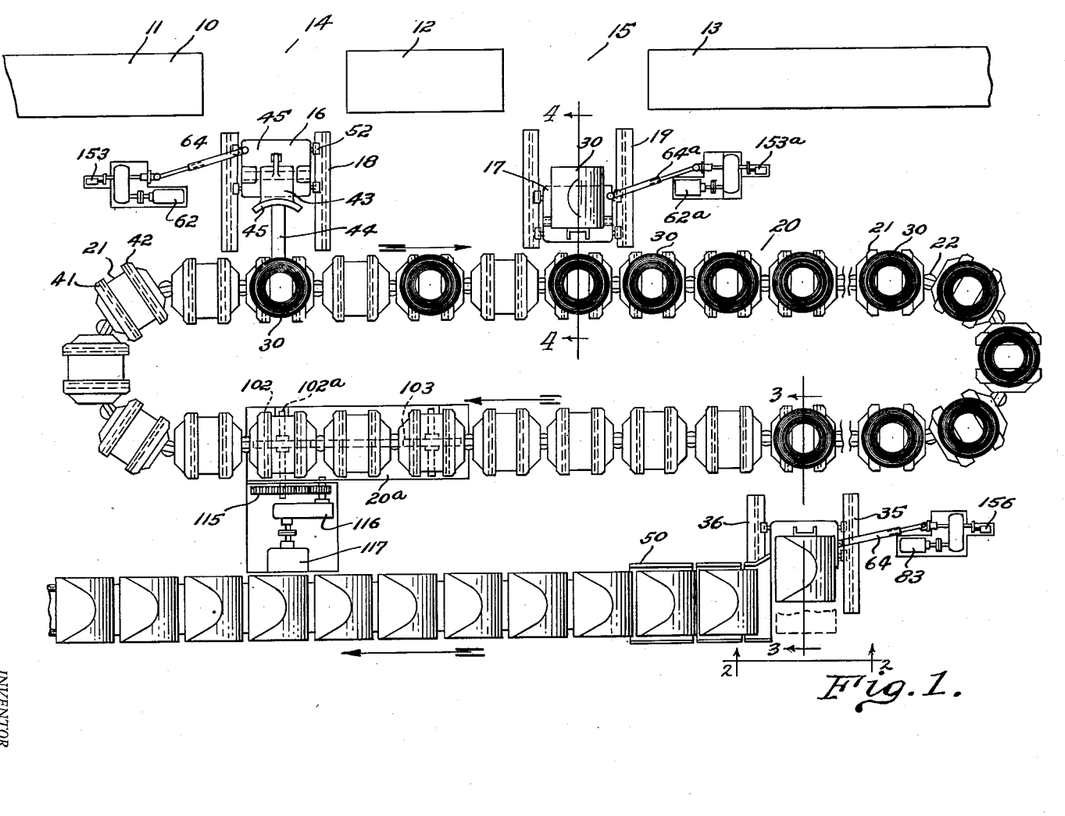
Fig. 1 is a plan view of the general layout of the conveyor installation including loaders and unloaders operating adjacent a "Carry-All" cooling conveyor and showing the relative position of these units to the run-out table at the end of the steel mill and the adjacent conveyor carrying coils to storage.

Referring to the drawings, particularly Fig. 1 which is a plan view of the general layout of the conveyor system here under consideration, the numeral 10 indicates the position of the finishing end of a modern steel strip mill and steel strip is discharged over the top of so-called run-out tables 11, 12, and 13. In positions 14 and 15 there is suitable mechanism for receiving the strips of steel and rolling them into coils. The arrangement of the steel mill mechanism is such that a so-called coiler mechanism at positions 14 and 15 alternately coil strips of steel and have automatic mechanism for releasing and stripping the coils of strip steel in a horizontal direction onto two loader mechanisms 16 and 17 shown in Fig. 1. Insofar as the mechanism here disclosed is concerned the cycle of operating begins when the loaders 16 and 17 move into position to receive the hot coils of strip steel to convey them away from the finishing end of the steel mill.

Figure 7:
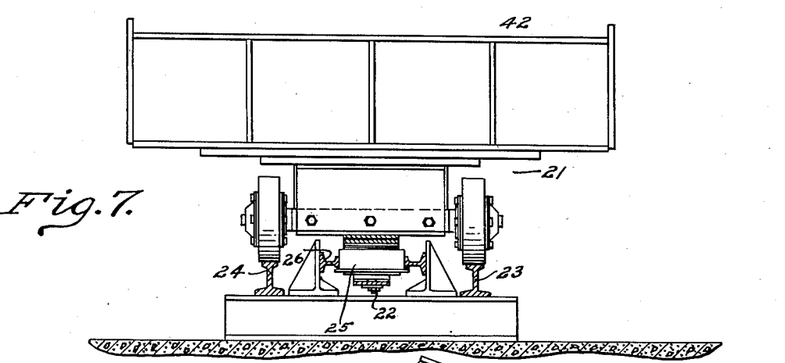
Fig. 7 is an end view of the truck and track arrangement.
Figure 8:
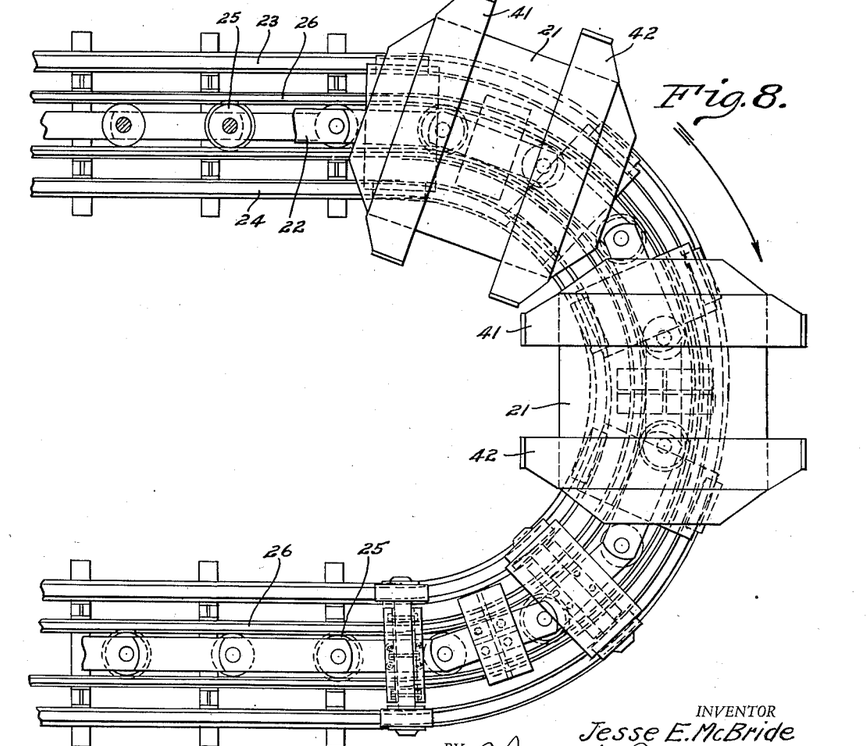
Fig. 8 is a top view showing certain details of the truck and track arrangement.

As shown in Fig. 1, the loaders 16 and 17 are mounted to roll or slide on short tracks 18 and 19, the loaders reciprocating from the position near the end of the steel mill toward and away from a cooling conveyor 20 which is built in the form of an endless loop and is of a type generally termed as a "Carry-All" conveyor. In this case the conveyor is made up of a series of trucks 21 evenly spaced around the endless loop and attached to a single strand chain 22. The trucks run on two rails 23 and 24 (Fig. 7) and are guided in the center by chain rollers 25 and adjacent rails 26.

In order to assure sufficient distance of conveyor travel from the point of loading to the point of unloading so that there will be an opportunity for the coils carried on their ends on the conveyor trucks 21 to cool to a temperature which will render them safe for handling without deformation, a length of loop of the conveyor 20 from the loader 17 to a point where an unloader mechanism 35 is positioned of as much as 600 feet has been found advantageous in actual practice, although this distance may be varied arbitrarily to suit conditions.

The unloader mechanism 35, like the two loader mechanisms 16 and 17, is mounted to reciprocate on short tracks 36 in a path at right angles to the path of the conveyor 20 but at the position of unloading.

Each truck 21 of the conveyor loop is provided with a carrying platform made up of two spaced upwardly extending portions 41 and 42 (Fig. 1) adapted to support the coil 30 standing on its end while allowing a space between the members 41 and 42 under the coil to facilitate the loading and unloading thereof.

Figures 4, 9:
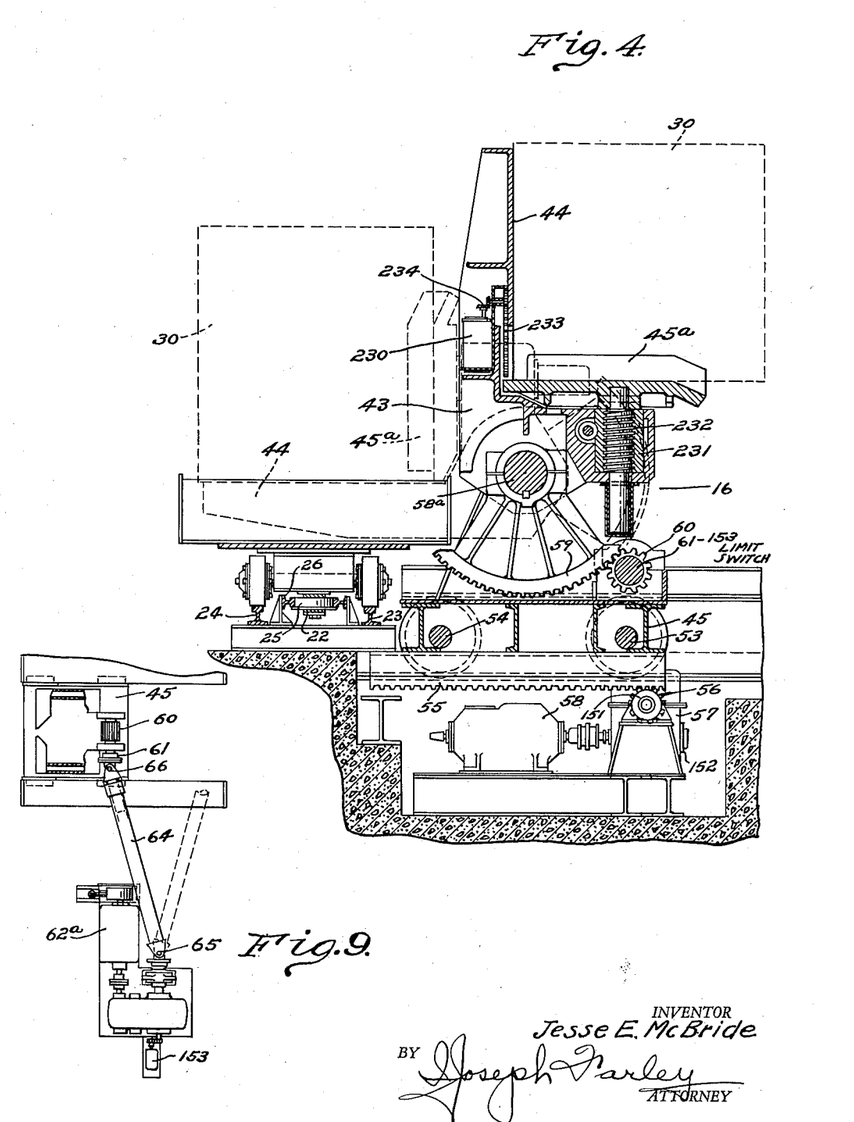
Fig. 4 is a section through the loader mechanism taken substantially on the line 4—4 of Fig. 1.
Fig. 9 is a top view of the telescoping drive shaft connecting the stationary drive for the tilting mechanism with the reciprocating carriage of loader or unloader.

Referring to Fig. 1 and Fig. 4, the essential moving parts of the loaders 16 and 17, (the loader 16 being taken as an example) are the tilting member 43 with its arm 44, carriage 45 with its coil support platen 45a. The arm 44 is of such width and shape as to be capable of insertion between the two beams 41 and 42 of each car 21, so that with a coil 30 supported on its side on the platen member 45a of carriage 45, and with the carriage 45 of the loader in proper position adjacent the conveyor, a tilting movement of the member 43 will place the coil 30 on its end on the truck 21 and on movement of the loader carriage 45 away from the conveyor, the arm 44 will be removed from under the coil and coil left on the platform of the truck. Likewise the unloader 35 with a similar tilting member inserted under the coil unloads the coil after the coil has travelled the cooling loop of the conveyor.

Considering further the general arrangement shown in Fig. 1, the two loaders 16 and 17 and the unloader 35, have the same general arrangement of tilting mechanism, although as will later appear, there are some differences in the detail thereof. For the purpose of general description of the arrangement shown in Fig. 1, however, it is sufficient to state that mechanism later to be described includes means to move the conveyor 20 in a step by step movement in such relation with the reciprocating movements of the loaders 16 and 17 and the unloader 35 that the conveyor will be in a stopped position when the loaders or unloaders are in a position to load or unload a coil and the movement of the conveyor will take place when the loaders and unloader are clear of the conveyor and are acting in their paths of movement away from the conveyor either to receive additional coils from the finishing end of the steel mill or to deposit a coil on the conveyor 50 after it is unloaded by the unloader 35.

Considering Figs. 1 and 4 and the detailed structure of the loader mechanism, it was previously mentioned that the tilting member 43 had arm 44 and coil support platen 45a. The carriage 45 previously mentioned is mounted to reciprocate on tracks 18 through rolls or wheels 52, four of which are shown in the view in Fig. 1. The shafts for mounting the wheels are shown at 53 and 54 in the sectional view of Fig. 4. The drive for reciprocating the carriage 45 toward and from the conveyor is made through a pair of rack bars at the sides of the carriage, one of these rack bars being shown at 55 in Fig. 4. A suitable pinion 56 driven through gear box 57 by electric motor 58 completes the drive for the so-called traverse movement of the carriage 45 toward and from the conveyor 20.

On further reference to the tilting mechanism of the loader shown in Fig. 4 and in the further detail in Fig. 9 it will be seen that the tilting member 43 is mounted to tilt on the shaft 58a and that the tilting member has a gear segment 59 attached thereto driven by a pinion 60 and a shaft 61, and hence causes a tilt of the member 43 when the shaft is driven by a suitable motor or other driving unit 62 for loader 16 which is shown in Figs. 1 and 9, a similar driving unit 62a for the loader 17 is also shown in Fig. 1. In order to make a satisfactory driving connection from the stationary driving unit 62 to the reciprocating carriage on which the tilting member 43 is mounted, a telescoping shaft 64 (Fig. 9) having two parts is provided, one of which parts is connected to the driving mechanism 62 by universal joint 65; the other part of the telescoping shaft being connected to the shaft 61 by a second universal joint 66. With this arrangement it is apparent that when the loader carriage reciprocates on its track, the telescoping shaft 64 will change in length and make possible a drive of the tilting mechanism at all points in the reciprocating path of travel of the carriage by the stationary driving means 62. It is to be understood that the two parts of the telescoping shaft 64 are suitably splined together so that drive is effected through them while allowing relative axial sliding movement for changing length.

Figure 2:
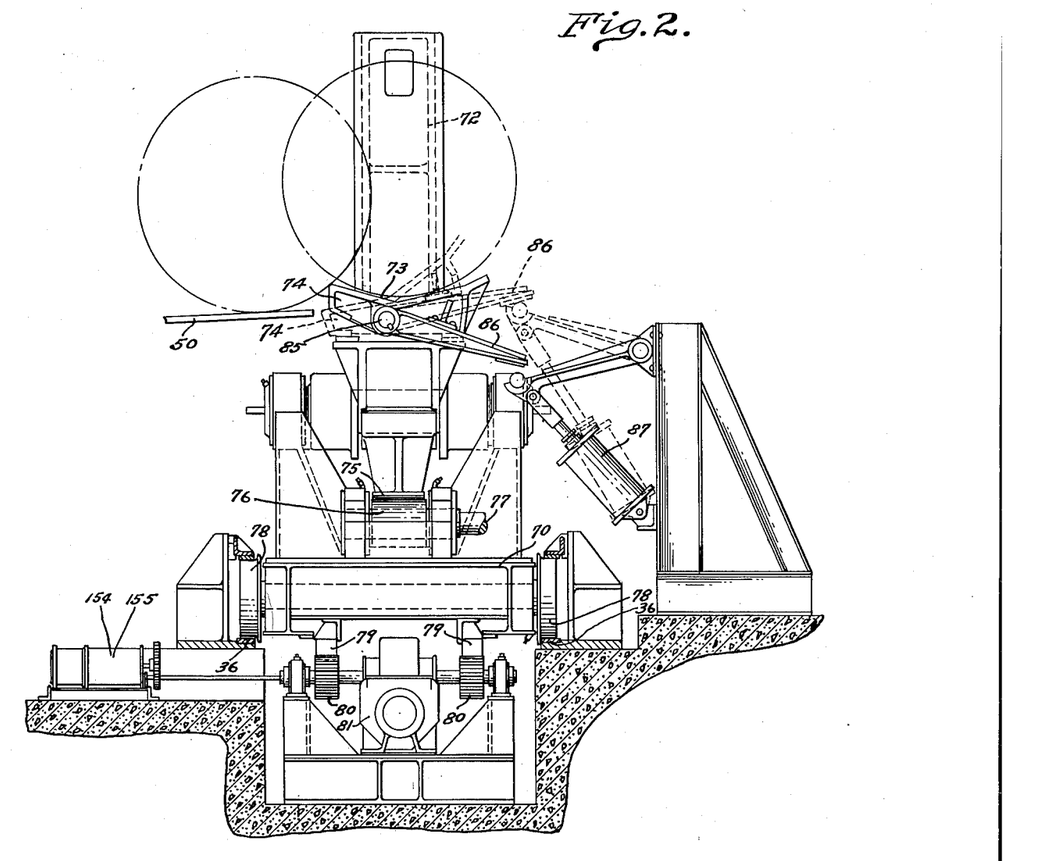
Fig. 2 is an end view of the unloader mechanism taken substantially on the line 2—2 of Fig. 1.
Figure 3:
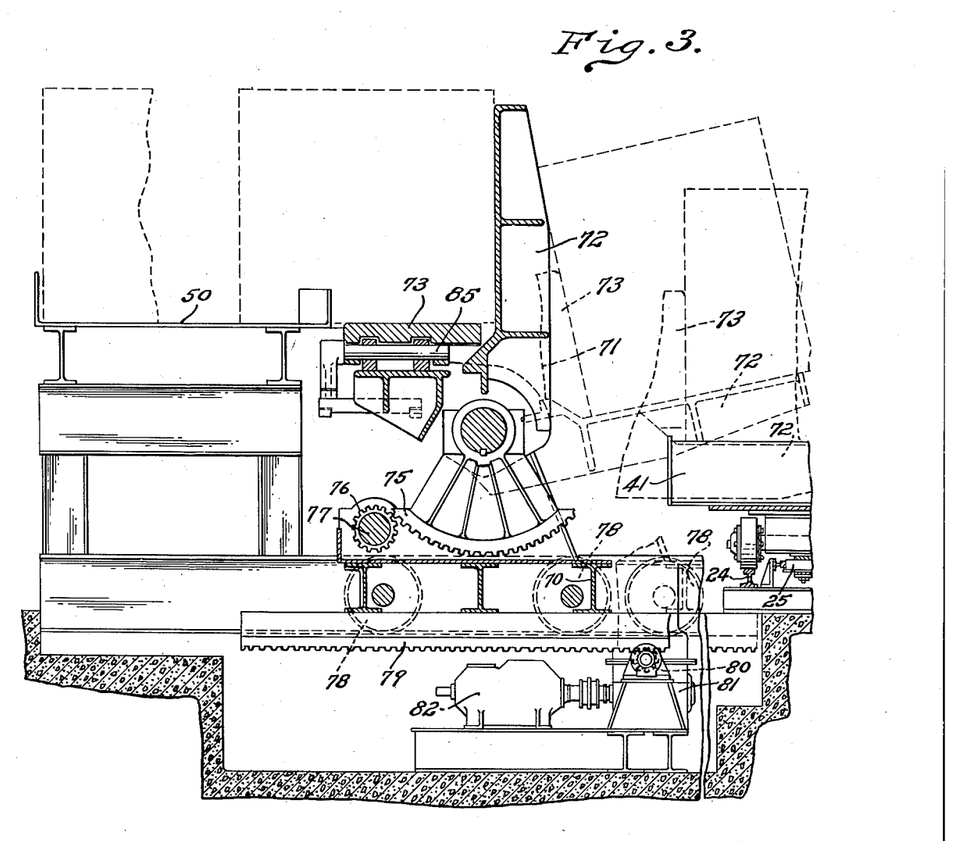
Fig. 3 is a section through the unloader mechanism taken substantially on the line 3—3 of Fig. 1.

Figs. 2 and 3 show end and sectional views of the unloader mechanism 35. In general arrangement the unloader is similar to the loader in that it has a carriage 70, a tilting member 71 with a bar 72, and coil support 73 and an additional tilt platform 74 as shown in Fig. 2. Like the loader, the unloader also has a gear sector 75 driven by pinions 76 from the shaft 77 for tilting the member 71 but for the purpose of unloading of coils from the conveyor. The carriage 70 is mounted to reciprocate on tracks 36 through wheels 78. The drive for the reciprocating or traverse movement is through rack bars 79, pinions 80 and gear box 81, the electric motor 82 furnishing the power for the drive. The drive for the tilt is produced by a motor 83 shown in Fig. 1 which connects with the shaft 77 through suitable telescoping shaft and universal joint connections similar to those used with the loader unit. For the purpose of producing transverse tilt to unload the coil from the support 75 a tilting platform 74 is mounted to tilt about a shaft 85 and is actuated in this tilting movement through an arm 86 and solenoid actuating mechanism 87.

Figure 5:
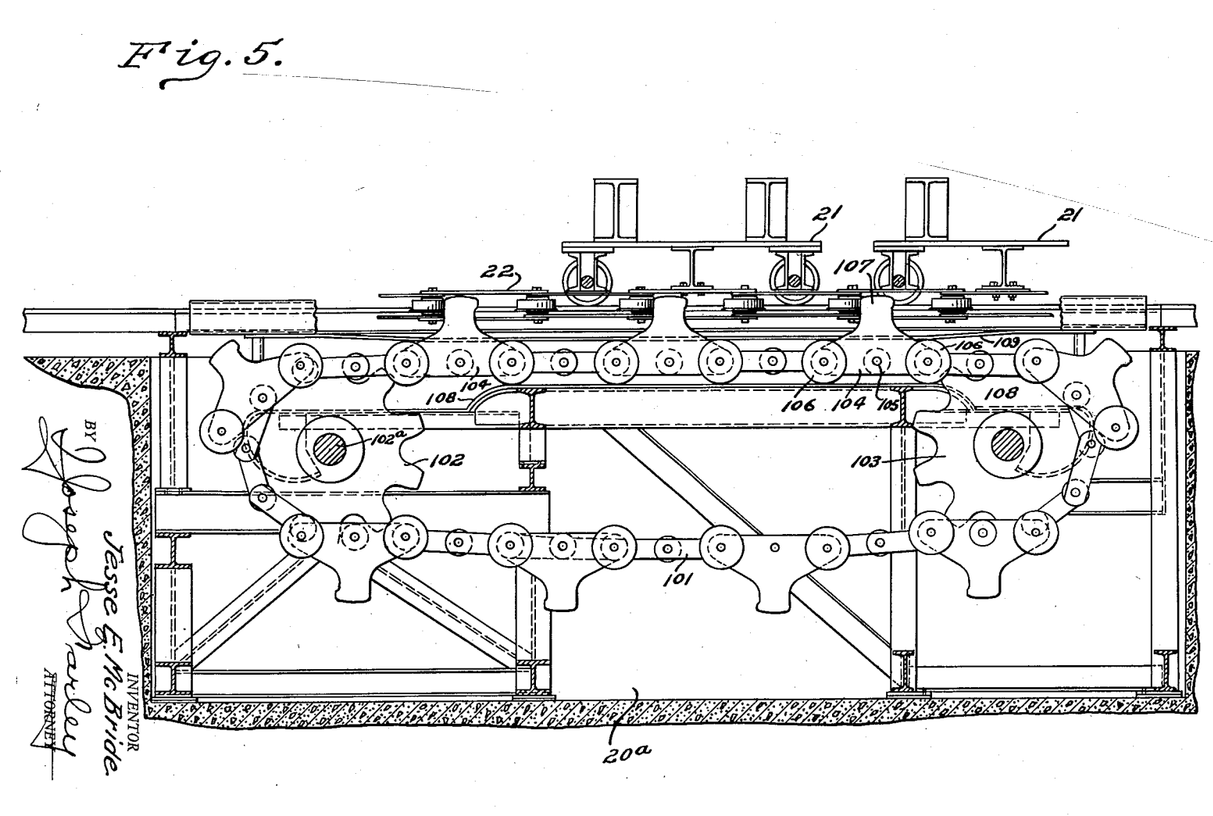
Fig. 5 is an elevation showing the Caterpillar drive for the "Carry-All" conveyor.

The "Carry-All" cooling conveyor 20, shown in Fig. 1, is driven by a Caterpillar drive located in a pit beneath the conveyor at a convenient point in the loop. This location is shown at 20a in Fig. 1 but the general arrangement of such a Caterpillar drive is shown in Figs. 5 and 6.

On reference to these figures it will appear that a Caterpillar chain 101 is carried around two sprockets 102 and 103. The Caterpillar chain has mounted thereon at spaced intervals a plurality of driving dogs 104 which are pivoted on the chain at points 105. Each of these driving dogs 104 has rollers 106 mounted at the lower corners thereof while the upwardly projecting portion 107 is formed to contact the rollers 25 of the chain 22. The driving dogs are mounted for contacting the chain by lower guide member 108 and upper guide member 109 which form tracks for the rollers 106, both when contact is made with the chain and departing from contact with the chain, and inspection of Fig. 5 will show that the form of the guide 108 at the right hand end will cause the member 104 to be tilted into contact with the chain and the form of the guide 108 at its left hand end will allow the member 104 to depart from contact and carry around the sprocket 102.

Figure 6:
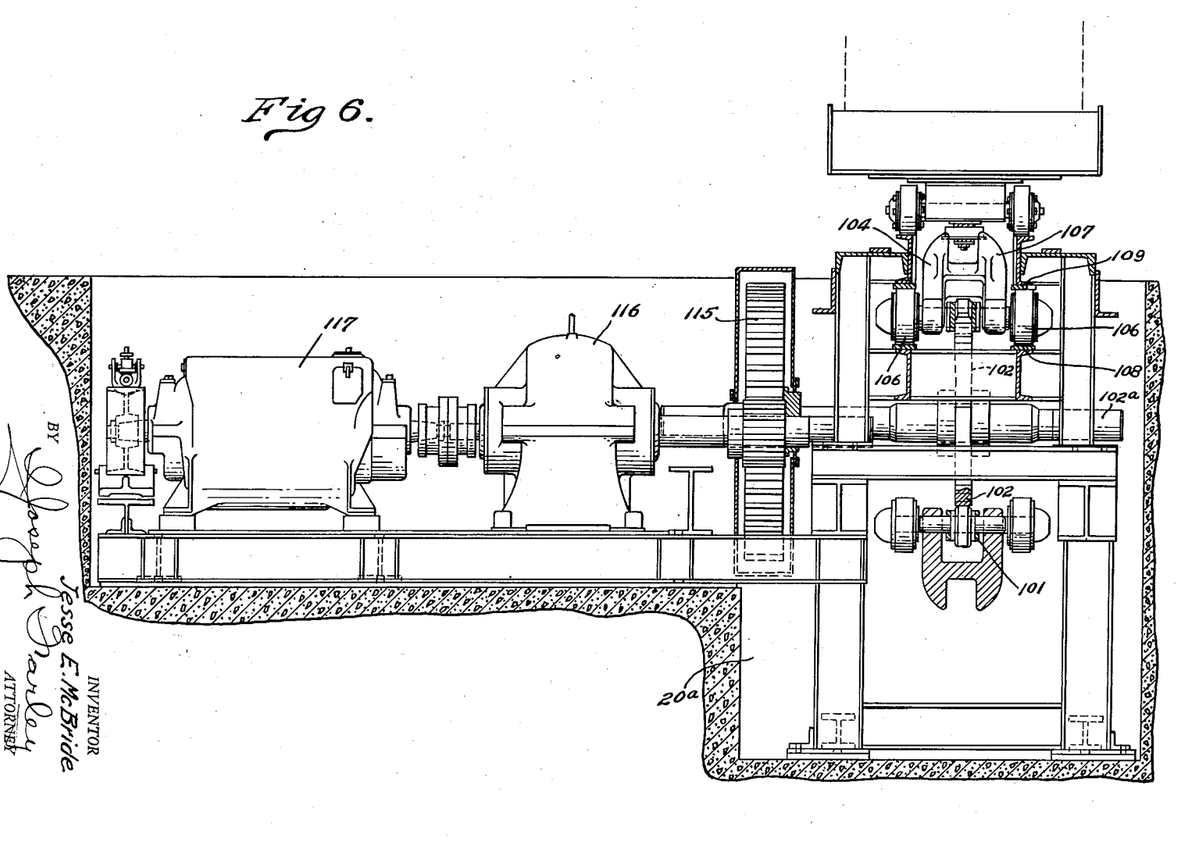
Fig. 6 is an end view of the "Carry-All" conveyor drive and also showing the means of connection to the "Carry-All" conveyor.

Referring to Fig. 6, the drive for the Caterpillar mechanism is shown which is accomplished by electric motor 117 through a shaft 102a for the sprocket 102 through gearing 115 and speed reducer gearing 116.

The coil cooling conveyor is provided with a type of electric motor control such that the actuation of the switch to start the conveyor in forward movement will cause the driving motor 117 to be accelerated in a definite cycle so that the acceleration is over a definite predetermined period of time, after which the driving motor is actuated at constant speed and after such operation for a definite period of time followed by a definite cycle of deceleration which brings the conveyor to a definite and predetermined stop without jerking. This is accomplished by decelerating the drive in such a length of time as will always tend to place a braking effect on the conveyor movement. That is, the deceleration imposed by the motors is slower than the natural deceleration of the conveyor to its stopping point, and therefore the conveyor is always under positive control of the motor drive. This cycle of operation of the driving motor 117 is preferably effected by such types of control as may be imposed on electric motors by variation of the field excitation, and preferably by such electrical means as is generally known as a Ward-Leonard system of control.

It is necessary also, in order to accomplish the result desired in this arrangement, to require that each movement of the conveyor and the cycle above mentioned from starting to stopping should result in a movement of the conveyor exactly sufficient to bring another car 21 in alignment with the loader and unloader units. A suitable type of limit switch 157 (Fig. 17), later described, rotated by the movement of the conveyor through the desired distance therefore controls the starting and stopping position of the unit.

For controlling the operation of the loaders 16 and 17 to produce the desired movement relative to the coil cooling conveyor the following units are used. For the purpose of illustration it is only necessary to specify the units required for one of the loaders, the other loader being similar in its equipment.

Figure 10:
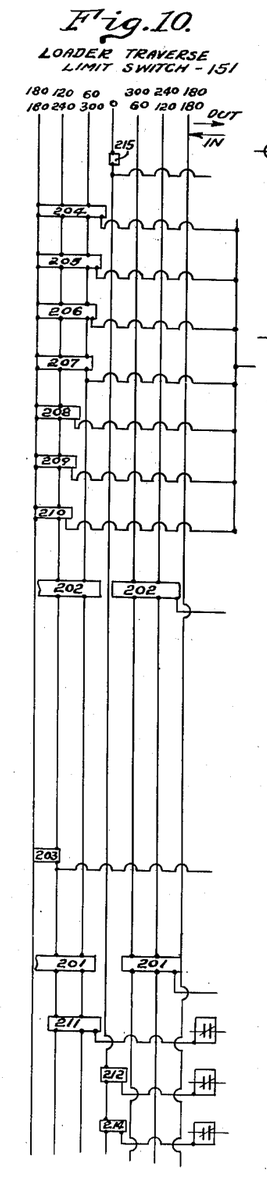
Fig. 10 is a drawing showing the arrangement of the electrical control limit switch for the loader traverse.

Fig. 10 shows a diagrammatic view of a loader traverse limit switch with markings indicating 0 to 360° rotation, it being understood that in this case one complete rotation of the limit switch is produced by a movement of the loader in its traverse from the position at which it receives a coil to the position adjacent the cooling conveyor where it places the coil on the car. The limit switch 151 shown diagrammatically in Fig. 10 is connected to be rotated by some member which moves with the loader traverse to and from the cooling conveyor, and for purposes of illustration may be considered as rotated by the same shaft which drives the pinion 56. (Fig. 4.) The Fig. 10 limit switch has a plurality of cams mounted thereon, each cam extending over a portion of the circumference over which it is desired to have the switch which it controls in a closed position. An illustration of the general arrangement used with one cam to close an electrical circuit being shown in Fig. 10a with a diagrammatic showing of a switch. Each cam shown in the diagrams may be considered as thus controlling an electrical circuit for the purposes hereinafter specified.

Assume that the zero position of the traverse limit switch shown in Fig. 10 coincides with the maximum position of the traverse away from the cooling conveyor, i. e. at the place where it receives the coil from the coiler of the steel mill. The diagrammatic view in Fig. 10, as marked "in" and "out" with arrows, indicates the direction of rotation of the limit switch cams past a switch actuator positioned at the zero line of the diagram, the "in" direction indicating that the movement of the limit switch in the direction shown by the arrow is toward the cooling conveyor and the "out" direction indicating that the movement of the limit switch is that showing when movement of the loader is away from the cooling conveyor. With this in mind, the cams shown in Fig. 10 are for control as follows:

Cam 201 controlling switch similar to that shown in Fig. 10a which when opened reduces the field strength on driving motor 58 (Fig. 4) to slow down the traverse movement of the loader. The cam 202 controls a throw-out switch to stop driving motor 58 when the traverse reaches maximum position away from the conveyor.

Cam 203 controls a slow-down contact like cam 201 but in this case it is for slow-down as the loader approaches the position toward the conveyor.

Cams 204 to 210 inclusive are several stop contacts for motor 58 in the position toward the conveyor, the position of stopping the traverse being varied for various coil diameters as will later be described.

Cam 211 closes contact which starts tilt motor 62 to tilt and raise a coil endwise onto a conveyor car as the traverse moves toward the conveyor.

Cam 212 closes suitable contact controlling motor 62 when the traverse approaches the coiler to allow the tilt to lower in position to receive a coil on its side on platen 45a.

Cam 214 closes contact to motor 117 (Fig. 6) when the traverse is clear of the conveyor to allow the conveyor to start its cycle of acceleration, uniform speed, and deceleration to place another empty conveyor car in position.

Cam 215 closes suitable contact to reset the control when the traverse is in the extreme position away from the cooling conveyor so that its next operation will be on the adjustable limit switch, later to be described in Fig. 11.

Figure 11:
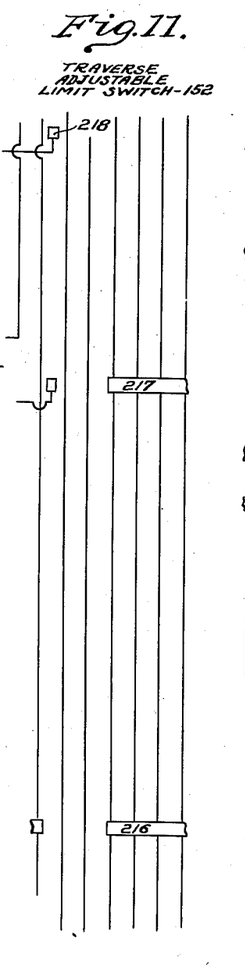
Fig. 11 shows the adjustable limit switch arrangement for the loader traverse.

The loader adjustable limit switch 152 as shown in Fig. 11 carries four cams. This switch 152 is also rotated by a member which moves in proportion to the loader traverse such as the same shaft which rotates pinion 56 (Fig. 4).

Cams 216 and 217 on switch 152 are slow-down and final stop contacts on this adjustable limit switch controlling motor 58 and are adjustable to make possible a control of the position of the traverse which is short of the extreme position thereof away from the coiler so that when the traverse has been stopped in its maximum "out" position by cam 202 of switch 151 the next very short movement of the traverse toward the cooling conveyor will be stopped at the proper position to receive a coil, from the end of the steel mill in correct position on the platen 45a regardless of its width, the adjustment on the switch making it possible to stop the traverse in the required position as it starts its movement toward the conveyer from the maximum traverse position.

Figure 13:
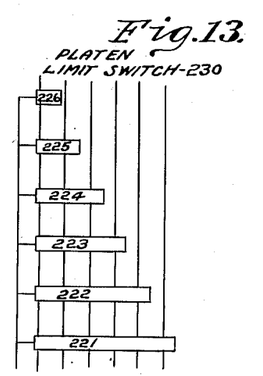
Fig. 13 shows platen limit switch for loader traverse.

Cam 218 is used to reset the control so that the next operation will be on the platen limit switch shown in Fig. 13.

The platen limit switch of Fig. 13 has six cams, 221, 222, 223, 224, 225, 226, which operate in conjunction with 204 to 210 inclusive on the previously described traverse limit switch shown in Fig. 10. The platen limit switch shown in Fig. 13 is mounted on the tilting member 44 of the loader unit shown in Fig. 4, the limit switch being indicated by the reference numeral 230. The switch is actuated in rotation by up and down movement of the platen member 45a which supports the coil, the height of the platen 45a being controlled by the screw thread unit 231, manually operated from a shaft 232. A rack bar 233 is secured to move upward and downward with the platen 45 and to rotate the limit switch by suitable gearing 234.

The platen 45a of the loader unit (Fig. 4) is provided with the manually operated mechanism to raise and lower the support member 45 so that it can be placed under coils of varying diameters when the centers of each of these coils is held at the same position by the coiler unit of the steel mill which forms the coils. This will, therefore, cause the center of the coils placed on their sides on the loader platen 45a to maintain the same center position, and if, as the loader mechanism is moved in its traverse up to the position at the side of the conveyor, the subsequent tilting to place the coil on the conveyor car would always place the center of the coil in the center of the car if the stopping position of the loader were always the same. However, it will be apparent on consideration, that if coils of very great difference in diameter are so placed in the center of the conveyor cars, their edges would not be in line on the outside of the conveyor cars as would be the ideal situation for picking them up for unloading. For the purpose, therefore, of assuring that the edges of the coils will be in substantial alignment, means is provided to change the stopping position of the loader mechanism on its track relative to the adjacent conveyor. For this purpose the platen limit switch shown in Fig. 13 is provided and connected to be operated by the movement of the member 45a, and when the member 45a is in the maximum down position for the largest coil, all of the limit switch contacts, 221 to 226, are closed, and in movement of the loader traverse limit switch shown in Fig. 10 with the loader as it moves toward the cooling conveyor, the contact controlling the stopping of motor 58 will not be finally broken until the last contact controlled by cam 201 in Fig. 10 is broken. Thus the loader makes its closest approach to the cooling conveyor. However, with the smaller diameter coil the platen member 45a will have a position upward from the maximum, and the contact controlled by cam 226, for instance, may be the only one in operation, the contacts controlled by cam 226 being in series with contact controlled by cam 210, and therefore the cam 210 on the loader traverse limit switch will stop the loader traverse motor at a predetermined position farther from the cooling conveyor suitable for that diameter, and thus place the edge of the smaller diameter coil substantially in line with the edge of the larger diameter coil. Such an alignment of the coils will obviously make it unnecessary to have special arrangement for locating the unloader 35.

The other cams 205 to 209 on Fig. 10, and cams 222 to 225 on Fig. 13, take care of intermediate sizes of coils and are connected to operate contacts respectively paired in series. It is apparent by this arrangement that the loader can be positioned to properly place coils of any diameter on the coil cooling conveyor so that their edges will be substantially in line thus facilitating subsequent unloader operation.

Figure 12:
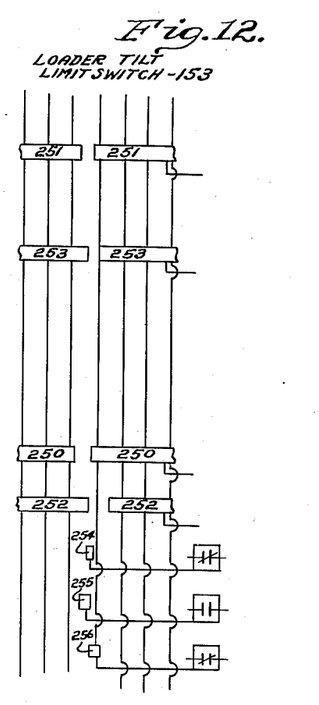
Fig. 12 shows the loader tilt limit switch arrangement.

The limit switch 153 shown in Fig. 12 is connected to be actuated by some member which moves in proportion to the tilt of the loader mechanism. This might be properly rotated by the shaft 61 (Fig. 4). Fig. 12 shows the limit switch 153 arrangement for the loader tilt mechanism and carries cams 250 and 251, which are slow-down and stop contacts for the tilt raise position which is a movement of the loader necessary to raise a coil on its end onto the conveyor, while cams 252 and 253 are respectively slow-down and stop contacts for the tilt lower position which is the position of the loader shown in Fig. 4 necessary to receive a coil on its side.

Cam 254 closes an appropriate contact when the tilt is lowered to allow motor 58 to start the traverse toward the conveyor.

Cam 255 closes when the tilt is raised and deposit of coil on conveyor completed to allow traverse to start toward the coiler.

Cam 256 closes when the tilt is lowered to allow some manipulation of the traverse, even though it is in the danger zone without shutting down the cooling conveyor.

Figures 14, 15, 16:
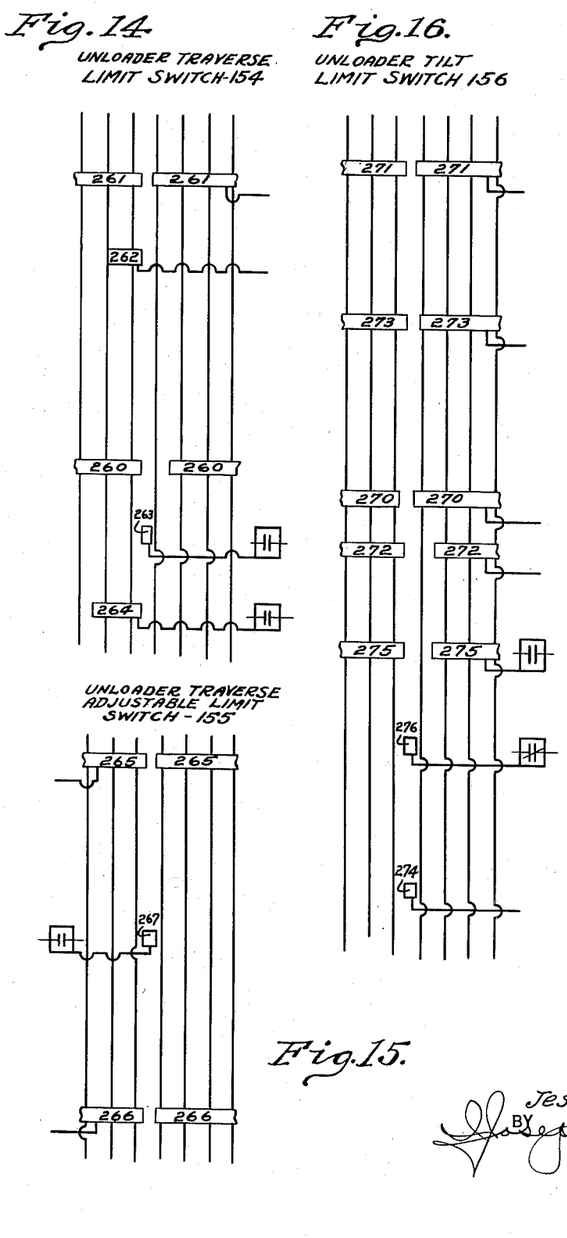
Fig. 14 shows limit switch arrangement for unloader traverse.
Fig. 15 shows limit switch arrangement for unloader tilt.
Fig. 16 shows adjustable limit switch arrangement for unloader traverse.

Fig. 14 shows the diagrammatic view of the unloader traverse limit switch. The unloader traverse limit switch is shown also at 154 in Fig. 2. This switch carries cams 260, 261 as controls for slow-down and stop contacts of motor 82 (Fig. 3) in a position toward the cooling conveyor, and also carries the cam 262 which provides operation within the safe limits of the traverse during hand control thereof, even though the cooling conveyor position switch is open.

Cam 263 closes a contact in the extreme "out" position of the unloader traverse to start motor 83 (Fig. 1) tilt to lower.

Cam 264 closes a contact when the traverse is clear of the conveyor to allow the conveyor to start.

The unloader traverse is also provided with an adjustable limit switch 155 shown in Fig. 15 and driven from the same shaft as switch 154 (Fig. 2) having a cam 265 and 266 which provide slow-down and stop contacts in the position away from the cooling conveyor, that is to position the unloader properly with reference to the auxiliary conveyor 50 (Fig. 1).

Cam 267 also on switch 155 closes to kick off the coil from the unloader to conveyor 50; that is, to actuate the solenoid unit 87 shown in Fig. 2.

The unloader tilt limit switch 156 is connected to be rotated by the unloader tilt mechanism, and could properly be connected to be rotated by the shaft 77, Fig. 3. The unloader tilt limit switch arrangement is shown in Fig. 16. It carries cams 270 and 271 for slow-down and final stop of the tilt lower position and cams 272 and 273 as controls for slow-down and final stop for the tilt raised position.

Cam 274 closes when the tilt is in position to allow the unloader kick off to be actuated i. e. the solenoid 87 previously mentioned.

Cam 275 closes after the tilt has been lowered slightly to start the unloader in toward the auxiliary conveyor 50.

Cam 276 closes when the tilt is fully raised to allow the traverse to move out toward the cooling conveyor.

Figure 17:
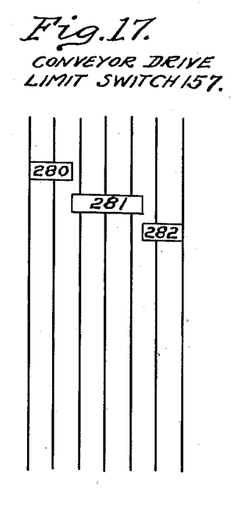
Fig. 17 shows switch arrangement for controlling the movement of the cooling conveyor.

The limit switch 157 shown diagrammatically in Fig. 17 may be secured to be rotated by any suitable rotating part of the loop conveyor drive (such as shaft 102a Fig. 5) and when the switch is started in rotation by the starting of the drive motor 117 the cam 280 causes operation of its switch connection to produce field excitation of motor 117 such that the drive is accelerated over the period of travel of the unit allowed by the length of the cam 280. After the drive has travelled a distance such that the cam 280 is no longer effective then cam 281 actuates its switch further controlling motor 117 to produce constant speed over the travel represented by its length. A cam 282 then actuates a third switch to produce uniform deceleration to stop the unit in a definite cycle by control of motor 117 as previously mentioned. The result is a definite cycle of movement from the starting to the stopping point with a definite distance of movement which stops the conveyor ahead an amount sufficient to bring an empty car in front of a loader and a loaded car in front of the unloader.

In the operation of the mechanism heretofore described, the coils of strip steel are received upon the platen 45a from the coiler of the steel mill. At this time the traverse of the loader has moved a short distance "in" from the maximum position "out" from the cooling conveyor. The stopping of the loader carriage in its traverse in position to receive a coil is controlled by the adjustable limit switch 152 (Fig. 11). The indication for the carriage to continue its traverse toward the cooling conveyor is made either by a hand controlled switch or by an automatic control connected with the steel mill coiler mechanism not here shown. However, the traverse proceeds in the "in" direction and from the loader traverse limit switch 151 (Fig. 10), the cam 211 thereon almost immediately closes a contact which starts the tilt motor 62 in operation to cause the tilt to raise, that is to rotate shaft 61 and thereby to tilt the member 43 in a counter-clockwise direction about shaft 58a so that it will raise the coil to an upright position opposite to that shown in Fig. 4, and as the traverse continues toward the cooling conveyor, the coil will be carried in an upright position for a major part of the distance of its travel. The member 44 will support the bottom of the coil, which member 44 it will be remembered, has been previously described as of such width as will project between the members 41 and 42 of the car 21. It is evident on inspection of Fig. 1 that such a continued movement of the traverse toward the conveyor will ultimately place the coil on the truck 21 with the member 44 between the members 41 and 42.

It previously has been mentioned that the cams 204 to 210 on switch 51 operate in cooperation with the cams 221 to 226 on platen limit switch 230 so that the loader is stopped at positions adjacent the conveyor appropriate to place the various sizes of coils with their edges substantially in line on the outside of the conveyor 20. The final movement of the tilt mechanism occurs at the end of the traverse and thereby places the coil on the conveyor and frees the member 44, and at this position the traverse moves in the opposite direction away from the cooling conveyor, and as it does so the tilt is again lowered to be in position to receive another coil.

It is most important to consider that, as the traverse moves out from the cooling conveyor after depositing the coil thereon, that there is provided on the limit switch 151 a contact controlled by cam 214 which when actuated will cause the cooling conveyor to start its cycle of operation to place another car in position to receive a coil. It must be remembered, however, that this starting of the cooling conveyor over its cycle of movement controlled by switch 157 of Fig. 17 will only occur if both the loaders and the unloader are clear of the conveyor, and if this is not the case the cycle will not start until such condition is fulfilled.

It is apparent therefore that the cooling conveyor may be set in operation in its step movement by any one of the three units i. e. the two loaders or the unloader when they move away from the cooling conveyor after performing their operation thereon. It is possible therefore to control the movement of the coil cooling conveyor in step by step movement, causing it to move forward automatically as coils are placed on or removed from the conveyor.

In general, the operation of the unloader is very similar to the loader and it is believed that this is obvious from previous discussions of the several switches and controls.

It is apparent that other units of material might be advantageously handled by this mechanism and that its use need not be confined necessarily to coils of steel, although the unit here described was designed for that purpose. In general the conveyor has been described specifically for the purpose of illustrating an operable unit, and it is understood that some variations in mechanical design may be made without departing from the fundamental principles set forth, and such variations are contemplated therein within the scope of the following claims.

I claim:

1. Mechanism for removing units of material, a conveyor, wheeled trucks carried by said conveyor, rigid supporting tracks therefor, upwardly spaced platforms on each of said trucks adapted to support a unit of material in an upright on end position with an open space between said platforms and under said unit of material, loader mechanism adapted to receive units of material, tilting mechanism on said loading mechanism adapted to carry a unit of material and to project into said open space between said platforms of said trucks of said conveyor, and reciprocating mechanism to move said tilting member and said loader at right angles to said conveyor toward and from a position to transfer said unit of material to one of said trucks by placing a portion of said tilting member in said open space between said platforms to deposit said unit thereon.

2. Mechanism for effecting transfer of units of material comprising a conveyor having spaced platforms to receive said units, a loader carriage mounted to reciprocate in a traverse toward and from a point adjacent said conveyor, a tilting member mounted on said loader carriage, a platen member on said tilting member formed to receive a unit of material in a substantially horizontal position, an adjustment for varying the height of said platen to support said unit of material thereon with the center thereof in the same vertical plane irrespective of the diameter of said unit, mechanism for actuating said tilting member to tilt said member and said unit of material to an upright on end position, driving mechanism for moving said carriage in its traverse toward said conveyor and by said tilting and traverse movement to effect deposit of said unit of material in an upright on end position on said conveyor by placing a portion of said tilting member between a pair of said spaced platforms and subsequently retracting said carriage in its traverse away from said conveyor, and automatic stop mechanism controlled by the position of said platen causing closest approach of carriage to said conveyor when said platen is set to receive the largest diameter of material and stopping said carriage farther from said conveyor at smaller diameter positions of said platen.

3. Mechanism for conveying units of material from a processing machine for delivery to a remote point comprising a conveyor adapted to receive and carry said units in an upright on end position, loader mechanism adapted to receive said units of material in a substantially horizontal position, mechanism on said loader to tilt said material to an upright on end position, means to reciprocate said loader in a traverse of movement toward and from said conveyor, cooperating members on said loader and said conveyor relatively positioned to effect transfer of said units of material from said loader to said conveyor, unloader mechanism located a substantial distance from said loader in the path of travel of said conveyor, means to reciprocate said unloader mechanism in a traverse of movement toward and away from said conveyor, cooperating members on said unloader and on said conveyor relatively positioned to effect transfer of said units of material from said conveyor to said unloader in an upright on end position, a tilting member on said unloader mounted to tilt said units of material to a substantially horizontal position, a second tilting member on said unloader supported by said first mentioned tilting member to roll said units of material from said unloader.

4. A combination with a conveyor for transferring units of material from a processing machine to a remote delivery point of, loading mechanism mounted to reciprocate in a traverse toward and from a position adjacent said conveyor, an unloading mechanism located in the conveyor path of travel a substantial distance from said loader with said unloading mechanism also mounted to reciprocate in a traverse toward and away from said conveyor, driving mechanism for said conveyor causing step by step movement in amount to successively place empty portions of said conveyor before said loader and filled portions before said unloader, control mechanism for starting said driving means actuated by said loader in its traverse away from said conveyor after completing its loading operation, and a second control mechanism for starting said driving means actuated by said unloading mechanism in its traverse away from said conveyor after completing an unloading operation, and connections between said control mechanisms such that said driving means can be started only when both loader and unloader mechanism are clear of interference contact with said conveyor.

5. The combination with a conveyor for transferring material from a processing machine to a remote delivery point of loader and unloader mechanism reciprocating in paths of travel toward and from loading and unloading positions adjacent said conveyor, driving mechanism for said conveyor causing a cycle of movement which when started accelerates said conveyor for a definite period, holds uniform speed for a period and decelerates for a period, control mechanisms for starting said cycle actuated by either said loader or unloader mechanism during its travel from said conveyor after said loader and unloader mechanisms have completed their respective loading and unloading operations.

6. A combination with a reciprocating transfer unit, having a tilting member mounted thereon, of stationary driving mechanism for driving said tilting member mounted adjacent said reciprocating transfer unit, connecting means from said reciprocating member to said stationary driving mechanism comprising a telescoping shaft having universal joint connections at each end thereof.

7. A mechanism for receiving and transferring coils of steel from a steel strip mill and delivering said coils to a remote delivery point comprising, a transfer conveyor adjacent to, laterally spaced from, and extending in parallelism with, said strip mill, said conveyor consisting of a plurality of spaced trucks, each being provided with a pair of upwardly projecting, spaced, load supporting platforms, a down-ender transfer loader mechanism located between said strip mill and said conveyor comprising a traveling carriage and means for reciprocating said carriage in a path extending at right angles to the line of travel of said conveyor and said strip mill for bringing said carriage into juxtaposition to said steel mill to receive a coil of steel therefrom, a tilting platform carried by said carriage to remove a coil of steel from the delivery end of said steel mill in a horizontal position and to rotate the same to an upright position as said carriage is reciprocated at right angles towards and from said mill, said tilting carriage having means for supporting a coil strip of steel in an upright position as said coil is tilted, and said coil supporting means being moved by the combined tilting and reciprocating movements to pass between and below the spaced load supporting platforms and to deposit the coil of steel thereon in an upright position.

8. A mechanism for receiving and transferring coils of steel from a steel strip mill and delivering said coils to a remote delivery point comprising, a transfer conveyor adjacent to, laterally spaced from, and extending in parallelism with, said strip mill, said conveyor consisting of a plurality of spaced trucks, each being provided with a pair of upwardly projecting, spaced, load supporting platforms, a down-ender transfer loader mechanism located between said strip mill and said conveyor and a similar unloader mechanism located at said remote delivery point, each of said loader and unloader mechanisms comprising a traveling carriage, a tilting platform mounted on said carriage having a coil supporting arm adapted to pass between said spaced load supporting platforms, means for reciprocating said carriage in a rectilinear path extending at right angles to the line of travel of said conveyor and means for simultaneously actuating said tilting platform to insert said arm into the space between said coil supporting platforms to successively place coils of steel from said steel mill thereon and to remove said coils at said remote delivery point.

9. A coil transfer mechanism for unloading horizontally disposed coils of steel from the delivery end of a steel strip mill, transferring said coils to a coil cooling conveyor to be carried thereby in an upright position to a remote delivery point comprising a coil loader located adjacent the delivery end of said steel mill and an unloader located at said remote delivery point characterized by said conveyor being provided with a plurality of spaced, wheeled trucks, each being provided with a pair of upwardly extending spaced coil supporting members extending at right angles to the line travel of said conveyor, and said loader and unloader each comprising a wheeled carriage, a tilting platform mounted on said carriage having a coil supporting arm adapted to extend between said spaced members, means for tilting said platform and means for reciprocating in unison with said tilting means said wheeled carriage to cause the coil supporting arms of said loader and unloader to be moved between and away from an adjacent pair of said spaced members for respectively placing a coil of steel thereon and removing it therefrom at said remote delivery point.

10. A coil transfer mechanism as set forth in claim 9 in which the wheeled carriage of said loader and unloader is supported on a pair of spaced parallel tracks extending at right angles to the line of travel of said conveyor, and the means for tilting said tilting platform consists of a driving motor in fixed relationship to said tracks and a combined universal joint and sliding shaft connections between said platform and motor to maintain a driving connection to said platform at all points of the reciprocating movement of said carriage.

JESSE E. McBRIDE.